United States Patent
Behling et al.

(10) Patent No.: US 11,111,804 B2
(45) Date of Patent: Sep. 7, 2021

(54) INSERTS FOR SLOTTED INTEGRALLY BLADED ROTOR

(71) Applicant: United Technologies Corporation, Farmington, CT (US)

(72) Inventors: Weston Behling, Norwalk, CT (US); Jason Leroux, Kensington, CT (US); Robert B. Fuller, Colchester, CT (US); Steven D. Roberts, Moodus, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 289 days.

(21) Appl. No.: 16/298,027

(22) Filed: Mar. 11, 2019

(65) Prior Publication Data
US 2020/0291802 A1 Sep. 17, 2020

(51) Int. Cl.
*F01D 11/00* (2006.01)
*F01D 5/30* (2006.01)

(52) U.S. Cl.
CPC .............. *F01D 11/008* (2013.01); *F01D 5/30* (2013.01); *F05D 2220/32* (2013.01); *F05D 2230/60* (2013.01); *F05D 2240/24* (2013.01); *F05D 2240/55* (2013.01); *F05D 2300/171* (2013.01); *F05D 2300/172* (2013.01);
(Continued)

(58) Field of Classification Search
CPC .......... F01D 11/008; F01D 5/30; F01D 5/282; F01D 5/284; F01D 5/143; F01D 11/006; F01D 5/34; F05D 2220/32; F05D 2230/60; F05D 2240/24; F05D 2240/55; F05D 2300/171; F05D 2300/172;
(Continued)

(56) References Cited

U.S. PATENT DOCUMENTS

| | | | | |
|---|---|---|---|---|
| 3,781,125 A | * | 12/1973 | Rahaim | F01D 9/042 415/115 |
| 3,897,171 A | * | 7/1975 | Stahl | F01D 5/284 416/244 R |

(Continued)

FOREIGN PATENT DOCUMENTS

| | | |
|---|---|---|
| EP | 2075411 A1 | 7/2009 |
| EP | 2404038 B1 | 10/2014 |

(Continued)

OTHER PUBLICATIONS

European Search Report, European Application No. 20151301.7, dated Jun. 16, 2020, European Patent Office; European Search Report 7 pages.

*Primary Examiner* — Aaron R Eastman
(74) *Attorney, Agent, or Firm* — Cantor Colburn LLP (57) ABSTRACT

Integrally bladed rotors (IBRs) are described. The IBRs include a central hub, an outer rim defining an outer circumference of the central hub, the outer rim defining a plurality of platforms, a plurality of circumferentially distributed blades, wherein a blade extends from each of the plurality of platforms, a rotor slot arranged between two adjacent blades, wherein the rotor slot is defined by a cut within the outer rim, and a rotor slot insert installed within the rotor slot, the rotor slot insert sized and shaped to fit within the rotor slot and prevent air leakage from a first side of the central hub to a second side of the central hub through the rotor slot during operation of the integrally bladed rotor.

20 Claims, 9 Drawing Sheets

(52) U.S. Cl.
CPC .. *F05D 2300/173* (2013.01); *F05D 2300/174* (2013.01); *F05D 2300/1723* (2013.01); *F05D 2300/20* (2013.01)

(58) Field of Classification Search
CPC ....... F05D 2300/1723; F05D 2300/173; F05D 2300/174; F05D 2300/20; F05D 2260/941
See application file for complete search history.

(56) References Cited

U.S. PATENT DOCUMENTS

| | | | |
|---|---|---|---|
| 4,536,932 A | 8/1985 | Athey | |
| 5,257,909 A * | 11/1993 | Glynn | F01D 5/3015 416/219 R |
| 7,097,422 B2 | 8/2006 | Rice et al. | |
| 7,887,299 B2 | 2/2011 | Xiao | |
| 2014/0161590 A1* | 6/2014 | Stiehler | F01D 5/08 415/116 |
| 2016/0003058 A1* | 1/2016 | Merry | F01D 5/34 416/182 |
| 2016/0069203 A1 | 3/2016 | Aiello | |
| 2019/0106997 A1* | 4/2019 | Chung | F01D 5/282 |

FOREIGN PATENT DOCUMENTS

| | | |
|---|---|---|
| EP | 3467320 A1 | 4/2019 |
| FR | 3027340 A1 | 4/2016 |
| JP | S63128202 U | 8/1988 |

\* cited by examiner

INSERTS FOR SLOTTED INTEGRALLY BLADED ROTOR

STATEMENT REGARDING FEDERALLY SPONSORED RESEARCH OR DEVELOPMENT

This invention was made with Government support awarded by the United States. The Government has certain rights in the invention.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

BRIEF DESCRIPTION

According to some embodiments, integrally bladed rotors are provided. The integrally bladed rotors include a central hub, an outer rim defining an outer circumference of the central hub, the outer rim defining a plurality of platforms, a plurality of circumferentially distributed blades, wherein a blade extends from each of the plurality of platforms, a rotor slot arranged between two adjacent blades, wherein the rotor slot is defined by a cut within the outer rim, and a rotor slot insert installed within the rotor slot, the rotor slot insert sized and shaped to fit within the rotor slot and prevent air leakage from a first side of the central hub to a second side of the central hub through the rotor slot during operation of the integrally bladed rotor.

In addition to one or more of the features described above, or as an alternative, further embodiments of the integrally bladed rotors may include that each of the rotor slot and the rotor slot insert have a dovetail geometry.

In addition to one or more of the features described above, or as an alternative, further embodiments of the integrally bladed rotors may include that the rotor slot insert comprises an integral stop configured to engage with the first side of the central hub.

In addition to one or more of the features described above, or as an alternative, further embodiments of the integrally bladed rotors may include that the rotor slot insert comprises a locking slot, the integrally bladed rotor further comprising a retaining element configured to engage with the locking slot, wherein the retaining element secures the rotor slot insert to the integrally bladed rotor on the second side of the central hub.

In addition to one or more of the features described above, or as an alternative, further embodiments of the integrally bladed rotors may include that the retaining element is a retainer ring.

In addition to one or more of the features described above, or as an alternative, further embodiments of the integrally bladed rotors may include that each of the rotor slot and the rotor slot insert has straight sidewalls, wherein the integrally bladed rotor further comprises an axial retaining element configured to secure the rotor slot insert to the integrally bladed rotor in an axial direction and a radially retaining element configured to secure the rotor slot insert to the integrally bladed rotor in a radial direction.

In addition to one or more of the features described above, or as an alternative, further embodiments of the integrally bladed rotors may include that the rotor slot insert is hollow.

In addition to one or more of the features described above, or as an alternative, further embodiments of the integrally bladed rotors may include that the rotor slot insert comprises a first material defining an exterior shell.

In addition to one or more of the features described above, or as an alternative, further embodiments of the integrally bladed rotors may include a second material within the exterior shell, wherein the second material is different from the first material.

In addition to one or more of the features described above, or as an alternative, further embodiments of the integrally bladed rotors may include that the exterior shell is filled with a gas or contains a vacuum.

In addition to one or more of the features described above, or as an alternative, further embodiments of the integrally bladed rotors may include that the rotor slot insert is formed of a material that is different than a material of the integrally bladed rotor.

In addition to one or more of the features described above, or as an alternative, further embodiments of the integrally bladed rotors may include that the material of the rotor slot insert is a softer material than the material of the integrally bladed rotor.

In addition to one or more of the features described above, or as an alternative, further embodiments of the integrally bladed rotors may include that the rotor slot insert is formed from a material selected from a nickel-base alloy, a titanium-base alloy, a cobalt-base alloy, an iron-base alloy, a steel alloy, an aluminum-base alloy, a magnesium-base alloy, a columbium-base alloy, a nickel-copper alloy, a copper alloy, a ceramic material, and a composite material.

In addition to one or more of the features described above, or as an alternative, further embodiments of the integrally bladed rotors may include that the rotor slot insert forms an interference fit with the integrally bladed rotor within the rotor slot.

In addition to one or more of the features described above, or as an alternative, further embodiments of the integrally bladed rotors may include that the rotor slot insert comprises a material having a higher thermal alpha than a material of the integrally bladed rotor to create an interference fit therebetween during operation of the integrally bladed rotor due to thermal expansion of the rotor slot insert.

In addition to one or more of the features described above, or as an alternative, further embodiments of the integrally bladed rotors may include that a plurality of additional rotor slots such that one rotor slow is arranged between each pair of blades of the integrally bladed rotor and a plurality of additional rotor slot inserts arranged such that each rotor slot includes a rotor slot insert installed therein.

According to some embodiments, gas turbine engines are provided. The gas turbine engines include an integrally bladed rotor having a central hub, an outer rim defining an outer circumference of the central hub, the outer rim defining a plurality of platforms, a plurality of circumferentially distributed blades, wherein a blade extends from each of the plurality of platforms, a rotor slot arranged between two adjacent blades, wherein the rotor slot is defined by a cut within the outer rim, and a rotor slot insert installed within the rotor slot, the rotor slot insert sized and shaped to fit within the rotor slot and prevent air leakage from a first side of the central hub to a second side of the central hub through the rotor slot during operation of the integrally bladed rotor.

In addition to one or more of the features described above, or as an alternative, further embodiments of the gas turbine engines may include a plurality of additional rotor slots such that one rotor slow is arranged between each pair of blades of the integrally bladed rotor and a plurality of additional rotor slot inserts arranged such that each rotor slot includes a rotor slot insert installed therein.

In addition to one or more of the features described above, or as an alternative, further embodiments of the gas turbine engines may include a plurality of integrally bladed rotors.

In addition to one or more of the features described above, or as an alternative, further embodiments of the gas turbine engines may include a high pressure compressor, wherein the integrally bladed rotor is a rotor of the high pressure compressor.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
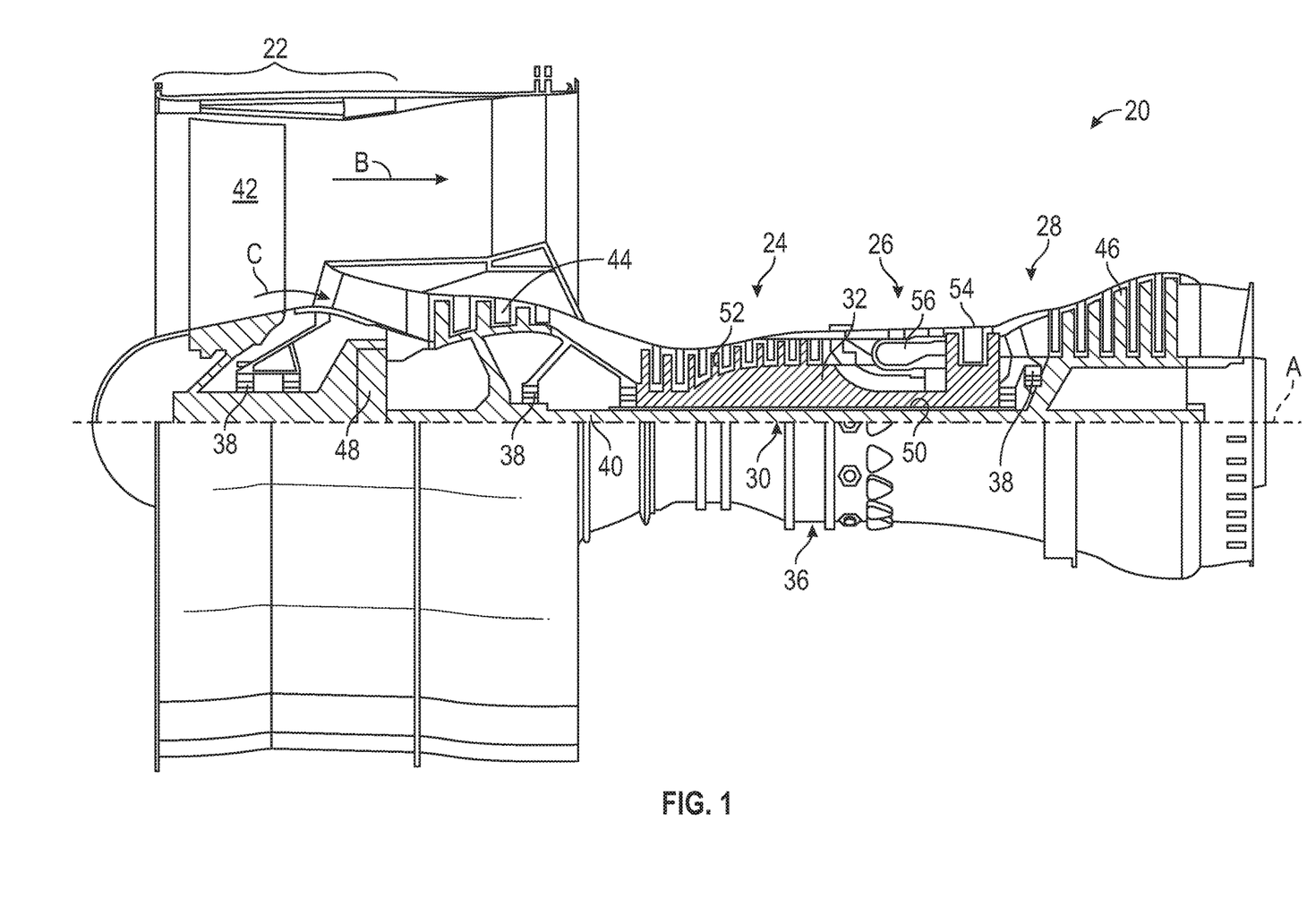
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
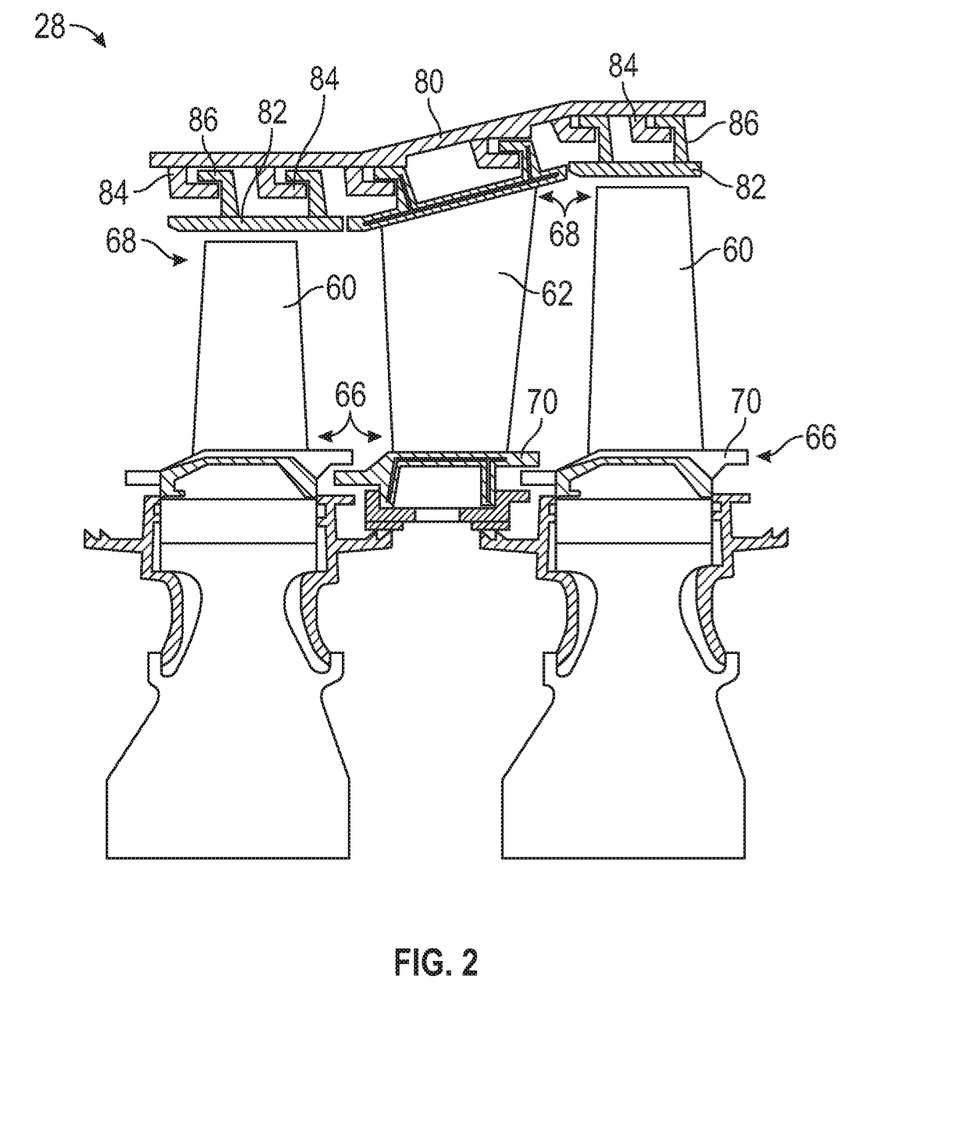
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
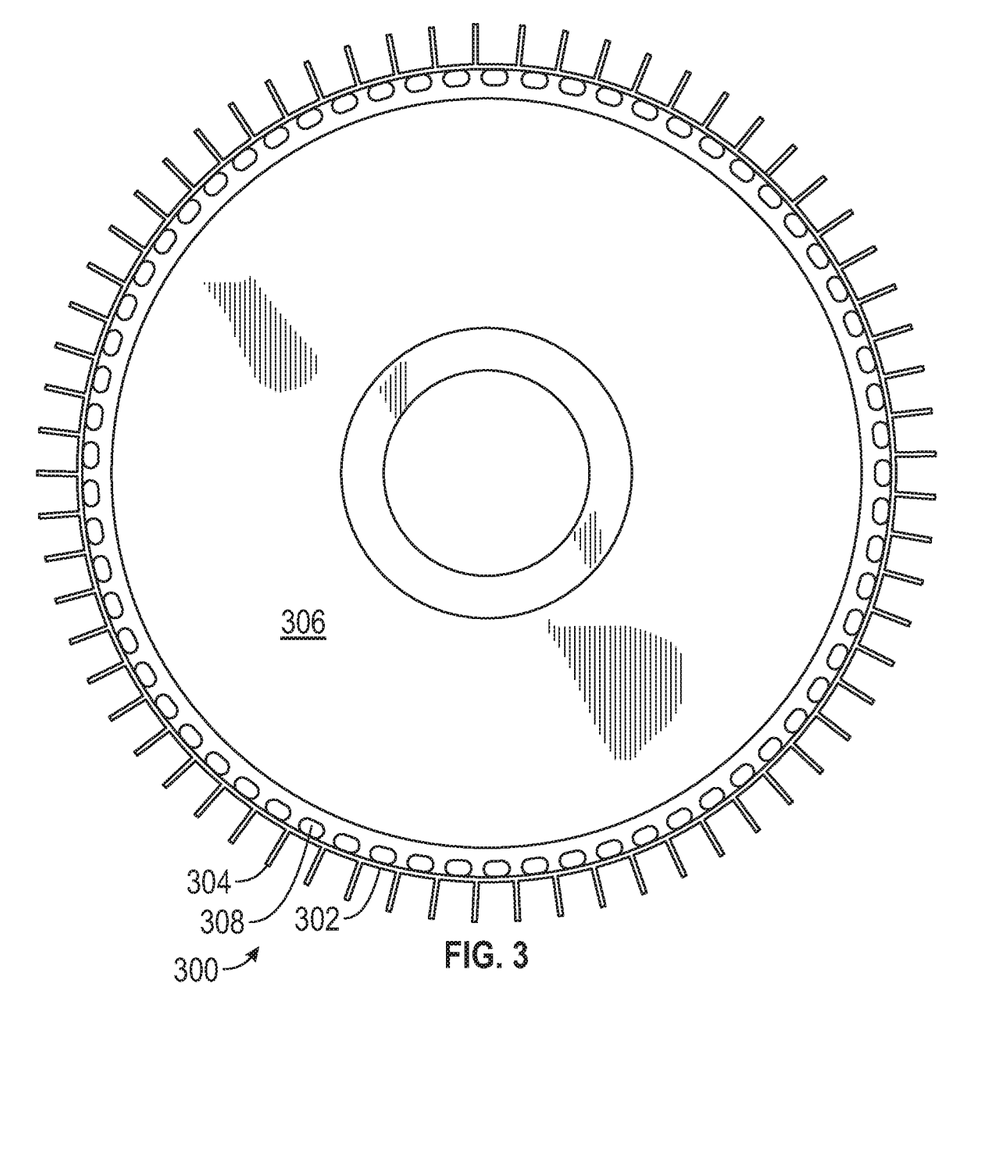
FIG. 3 is a schematic illustration of an integrally bladed rotor that may incorporate embodiments of the present disclosure.

FIG. 3 is a schematic illustration of an integrally bladed rotor 300, such as may be utilized for a high stage compression section of a gas turbine engine. In some embodiments, the integrally bladed rotor 300 may be implemented within a turbine section similar to that shown in FIG. 2, with the integrally bladed rotor 300 providing for the rotor and blades. The integrally bladed rotor 300 includes an outer rim 302, a plurality of circumferentially distributed blades 304, a central hub 306, and a plurality of rotor slots 308. The rotor slots 308 can be configured to extend through the axial width of the integrally bladed rotor 300 (e.g., into and out of the page of FIG. 3). The rotor slots 308 and various discontinuities may be configured to address hoop stresses associated with operation of the integrally bladed rotor 300 within a gas turbine engine.

Embodiments of the present disclosure are directed to, in part, reducing hoop stresses of integrally bladed rotors. Further, some embodiments are directed to increasing fracture life in an airfoil fillet of the integrated bladed rotor. The fillet radius from the integrated bladed rotor platform to the integrated airfoil can create a stress concentration that can be difficult reduce to a manageable level that meets life requirements. The flaw detection size on an airfoil fillet is large due to the complicated geometry. The increased flaw detection size further decreases the fracture life. One current design solution includes the use of localized trenches to shield the airfoil fillet and increase of airfoil radius.

Another solution involves the use of cuts or slots formed in the platform area between blades of the integrally bladed rotor (e.g., rotor slots 308 shown in FIG. 3). The slots typically extend radially from the platform rim to the neck of the rotor in-between all or some of the airfoils on the integrally bladed rotor. In accordance with embodiments of the present disclosure, the profile(s) of the rotor slots can be customized to any shape to meet specific stress target goals. Further, the profiles may be arranged to receive and hold rotor slot inserts radially during operation.

The rotor slots are configured to break the hoop stress at the airfoil fillet and move the limiting hoop stress radially inward to a more manageable location on the integrally bladed rotor. When a rotor slot is added, the limiting hoop location is located at the bottom of the rotor slot where different profiles (ellipses for example) can be incorporated to greatly reduce the stress magnitude. Furthermore, the bottom of the rotor slot can be inspected with a smaller flaw size detection capability than the airfoil fillet. The combination of reduction in hoop stress and decrease flaw size detection may enable an increase in the fracture life of the integrally bladed rotor as a whole. Rotor slot inserts of the present disclosure can be employed to minimize air leakage caused by the inclusion of the rotor slots on an integrally bladed rotor. The slotted integrally bladed rotor is similar to an axial bladed insert, but without the blade attached to the insert. The slotted integrally bladed rotor may be lighter in weight and has the potential of less air leakage than an axial bladed design if slots are not incorporated between every airfoil of the integrally bladed rotor. The slotted integrally bladed rotor has the advantage of reduced hoop stress over a conventional integrally bladed rotor, but at the cost of increased air leakage.

The rotor slot inserts of the present disclosure are designed to match the slot profile and are created separately from the integrally bladed rotor. The rotor slot inserts are configured to slide into the rotor slots. The engagement between the rotor slot inserts and the integrally bladed rotor, in accordance with embodiments of the present disclosure, may be by press fit or some other desired tolerance to address leakage requirements. Further, additional tabs or retention devices and/or mechanisms can be employed to retain or hold the rotor slot inserts in place during operation of the integrally bladed rotor. The rotor slot inserts can be made of any desired material and from any manufacturing process (e.g., additive manufacturing, 3D printing, conventional machining, etc.) to meet specific requirements and/or achieve desired characteristics/properties. In some non-limiting embodiments, the rotor slot inserts of may be hollow or filled with relatively light-weight materials to reduce dead weight pull on the integrally bladed rotor during operation. In some embodiments, a retainer ring may be employed to prevent movement in an axial direction of the engine (e.g., into or out of a plane of the integrally bladed rotor disk).

Figure 4:
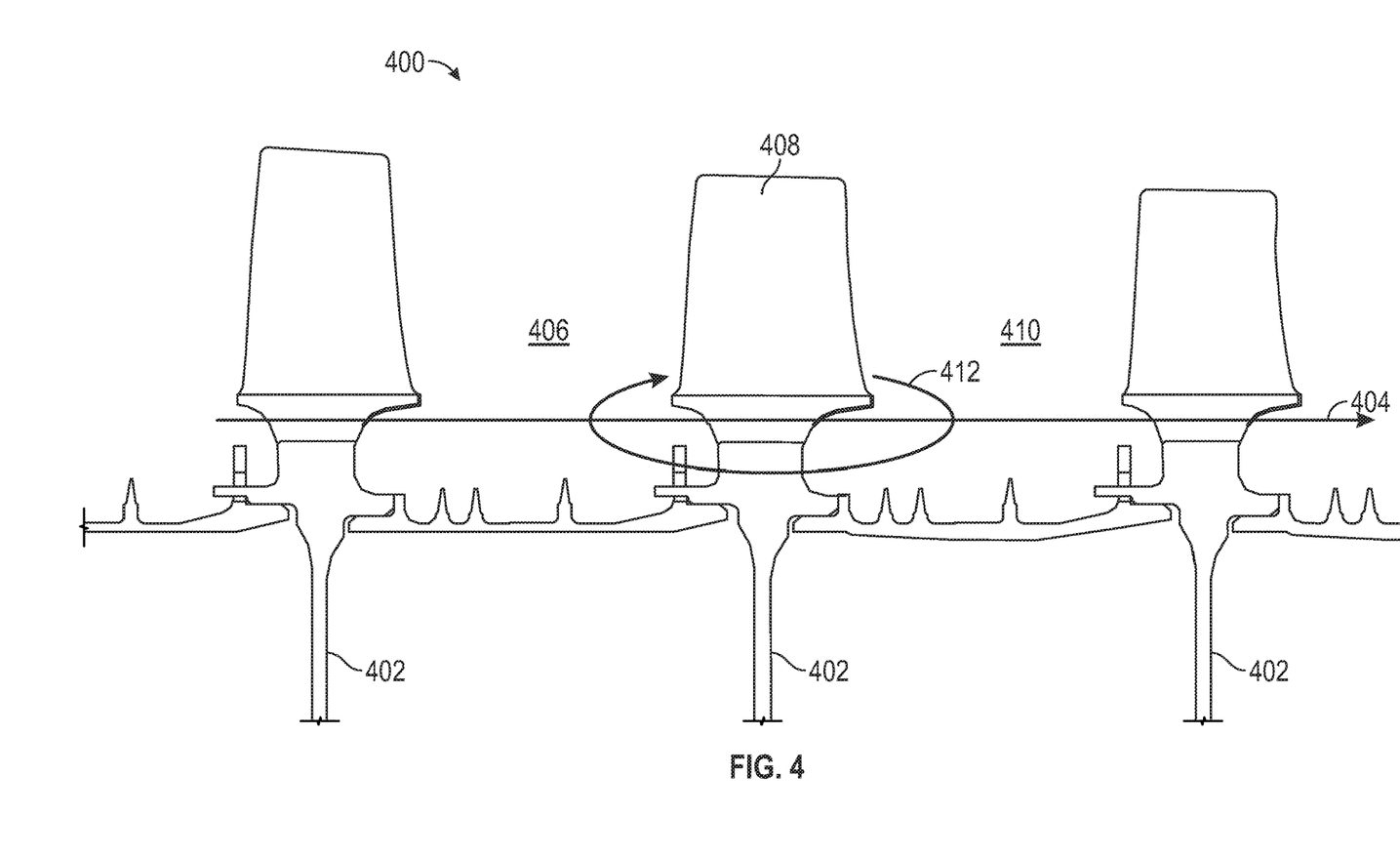
FIG. 4 is a schematic illustration of a turbine section of a gas turbine engine that may incorporate embodiments of the present disclosure.

Turning now to FIG. 4, a schematic illustration of a portion of a high pressure compressor 400 of a gas turbine engine is shown. The high pressure compressor 400 includes a plurality of integrally bladed rotors 402 arranged along an axis of the gas turbine engine. Air is compressed (i.e., pressure increased) downstream of each integrally bladed rotor 402, and thus as an air flow 404 flows through the high pressure compressor 400, the air is compressed to higher and higher pressures. Due to the pressure change about a given integrally bladed rotor 402, a relative low pressure region 406 exists upstream of blades 408 of the integrally bladed rotor 402 and a relatively high pressure region 410 exists downstream of the blades 408. If the integrally bladed rotors are configured with a slotted configuration (e.g., as shown in FIG. 3), a recirculation 412 of air may arise. That is, with no rotor slot inserts, the compressed air can return to a position upstream of a previous airfoil 408 through holes in the neck, which can thus cause a reduction or even eliminate a pressure delta. Reduction is the pressure delta can reduce performance and efficiently of gas turbine engine. Accordingly, the rotor slot inserts can reduce leakage and pressure drop, and thus improve efficiency of the gas turbine engine.

Figure 5A:
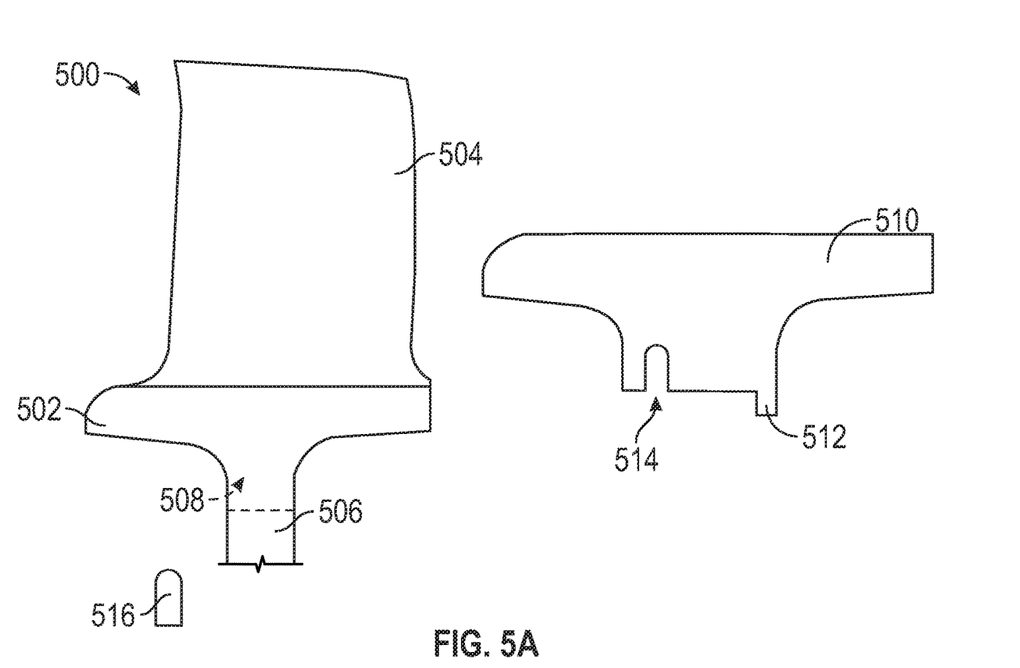
FIG. 5A is a schematic illustration of a rotor slot insert and integrally bladed rotor, pre-assembly, in accordance with an embodiment of the present disclosure.
Figure 5B:
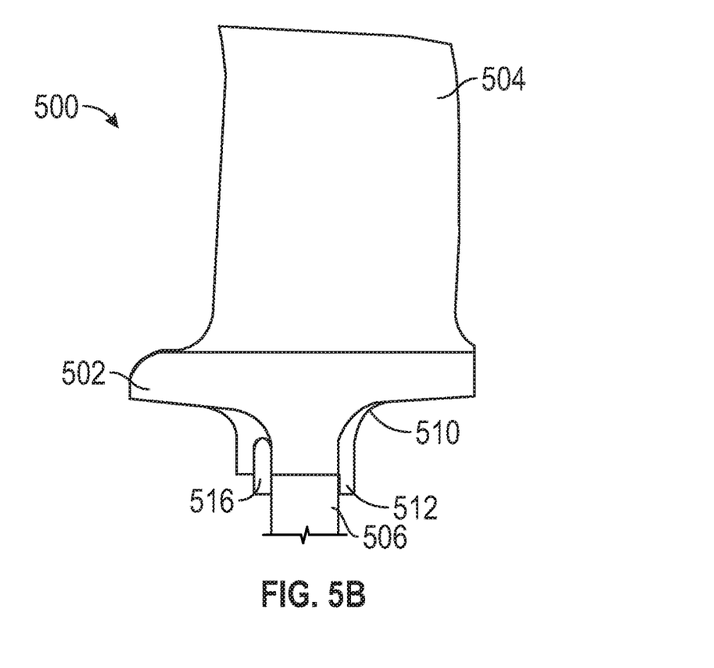
FIG. 5B is a schematic illustration of the rotor slot insert and integrally bladed rotor of FIG. 5A, as assembled.

Turning now to FIGS. 5A-5B, schematic illustrations of an integrally bladed rotor 500 in accordance with an embodiment of the present disclosure. The integrally bladed rotor 500 may be similar in structure to that shown in FIG. 3. The integrally bladed rotor 500 includes an outer rim or platform 502, a plurality of circumferentially distributed blades 504, a central hub 506, and a plurality of rotor slots 508, with the rotor slots 508 arranged between adjacent blades 504. The integrally bladed rotor 500 further includes a rotor slot insert 510 that can be installed into a rotor slot 508 of the integrally bladed rotor 500. The rotor slot insert 510 is sized and shaped to fit within the rotor slot 508 to prevent airflow from flowing between opposing sides of the integrally bladed rotor 500 (e.g., opposing surfaces of the central hub 506 or opposing sides relative to the blades 504). FIG. 5A illustrates the rotor slot insert 510 and integrally bladed rotor 500 pre-assembly and FIG. 5B illustrates the rotor slot insert 510 installed into the rotor slot 508 of the integrally bladed rotor 500.

The rotor slot insert 510, in this embodiment, includes an integral stop 512 and a locking slot 514. The integral stop 512 and the locking slot 514 are arranged or spaced apart such that when installed to the integrally bladed rotor 500, the integral stop 512 will contact a first side of the integrally bladed rotor 500 (e.g., on the central hub 506) and the locking slot 514 is arranged and accessible on an opposite or second side of the integrally bladed rotor 500 (e.g., opposite side of the central hub 506), as shown in FIG. 5B. The locking slot 514 is configured to receive a retaining element 516. The retaining element 516 may be a ring, such as a snap ring, that can extend about an entire circumferential span of the integrally bladed rotor 500. In other embodiments, the retaining element 516 may be a discrete locking element, such as a pin that can be engaged with part of the integrally bladed rotor 500 to retain the rotor slot insert 510 to the integrally bladed rotor 500.

Figure 6A:
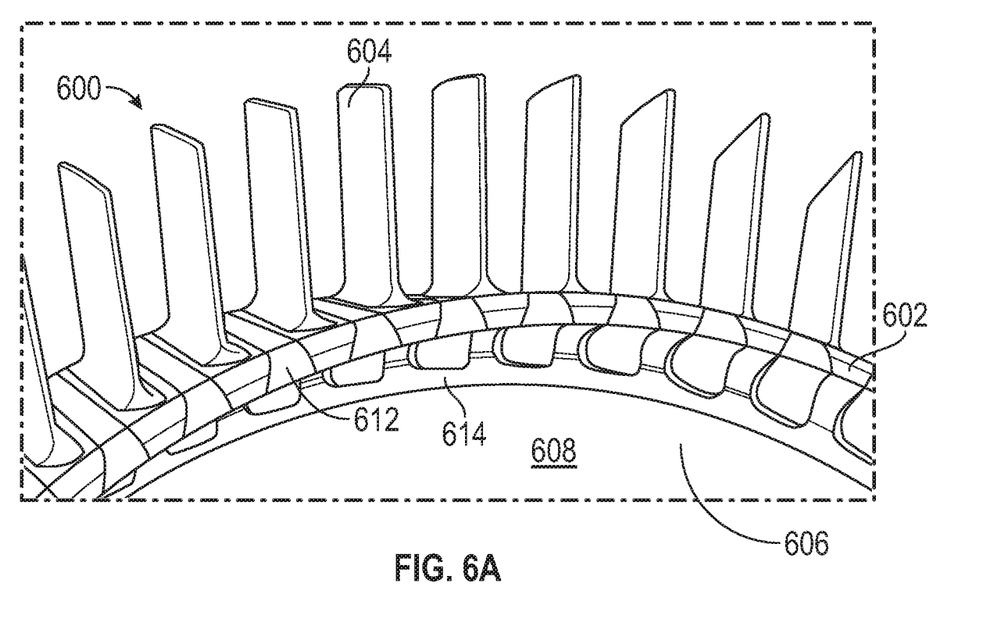
FIG. 6A is a schematic illustration of an integrally bladed rotor in accordance with an embodiment of the present disclosure, illustrating a first side of the integrally bladed rotor.
Figure 6B:
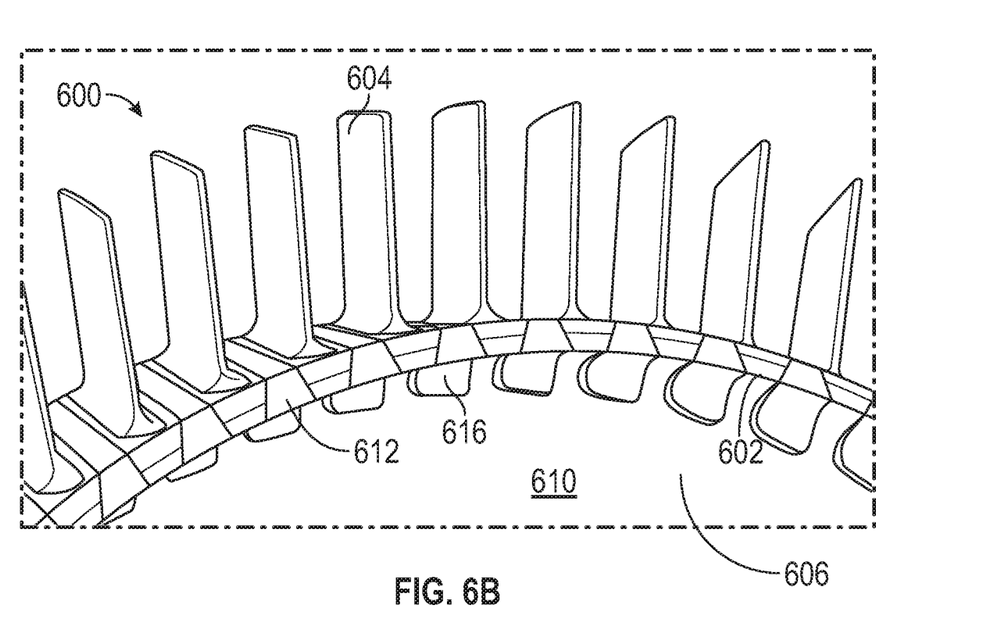
FIG. 6B is a schematic illustration of the integrally bladed rotor of FIG. 6A, as viewed toward a second side of the integrally bladed rotor.

Turning now to FIGS. 6A-6B, schematic illustrations of an integrally bladed rotor 600 in accordance with an embodiment of the present disclosure are shown. The integrally bladed rotor 600 may be similar to that shown and described with respect to FIGS. 5A-5B. The integrally bladed rotor 600 includes an outer rim or platform 602, a plurality of circumferentially distributed blades 604, a central hub 606 having a first side 608 and a second side 610, and a plurality of rotor slots (not shown) with the rotor slots arranged between adjacent blades 604. The integrally bladed rotor 600 further includes rotor slot inserts 612 that are installed into to the rotor slots of the integrally bladed rotor 600. The rotor slot inserts 612 are sized and shaped to fit within the rotor slots to prevent airflow from flowing between opposing sides 608, 610 of the integrally bladed rotor 600. FIG. 6A illustrates an isometric illustration of the first side 608 of the integrally bladed rotor 600 and FIG. 6B illustrates an isometric illustration of the second side 610 of the integrally bladed rotor 600.

As shown in FIG. 6A, the rotor slot inserts 612 are retained to the first side 608 by a retaining element 614, which may engage with the rotor slot inserts 612, as described above. On the second side 610, the rotor slot inserts 612 include an integral stop 616 that engages with the second side of the central hub 606. Although shown in this configuration with a retaining element 614 on one side and an integral stop on the opposing side, such configuration is not to be limiting. In some embodiments, both sides of the rotor slot inserts may be retained or held in place using a retaining element. Further, in some embodiments, the retaining element(s) may be eliminated entirely. For example, in some such embodiments, the rotor slot inserts may be held in place through an interference fit between the rotor slot insert and the material of the integrally bladed rotor (e.g., the dimensions of the rotor slots are smaller than the dimensions of the rotor slot inserts).

The rotor slot inserts, in accordance with embodiments of the present disclosure, are configured to match a slot profile of the rotor slots. The rotor slot inserts are configured to act as seals to reduce leakage (e.g., reduce/prevent recirculation 412 shown in FIG. 4). In some embodiments, the rotor slot inserts may be held axially by a retaining element (e.g., retaining ring, insert tab, etc.). Further, the rotor slot inserts may be held radially within the integrally bladed rotor due to a rotor slot profile shape, insert tabs, or retainer rings.

Figure 7:
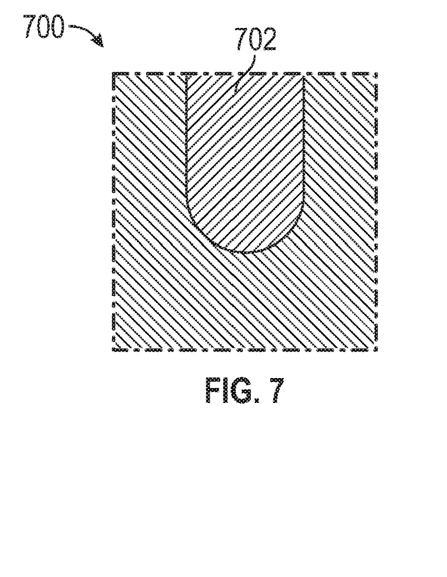
FIG. 7 is a schematic illustration of an integrally bladed rotor and rotor slot insert with the rotor slot insert having straight sidewalls.
Figure 8:
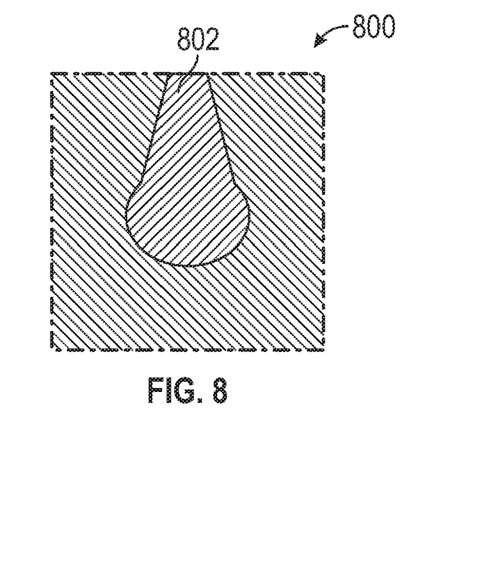
FIG. 8 is a schematic illustration of an integrally bladed rotor and rotor slot insert with the rotor slot insert having a dovetail geometry.

The geometry of the rotor slots and the rotor slot inserts may be varied based on various consideration. For example, straight sided slots may be implemented, and in other embodiments, the dovetail slots may be implemented. For example, FIG. 7 illustrates an integrally bladed rotor 700 having a straight-sided rotor slot insert 702 installed into a corresponding straight-sided rotor slot. FIG. 8 illustrates an integrally bladed rotor 800 having a dovetail rotor slot insert 802 installed into a corresponding dovetail rotor slot. Other geometries may be implemented without departing from the scope of the present disclosure. For example, a cylindrical shape with a straight-sided slot extension extending to a surface of the rim of the integrally bladed rotor may be used, with a respectively shaped rotor slot insert.

Figure 9:
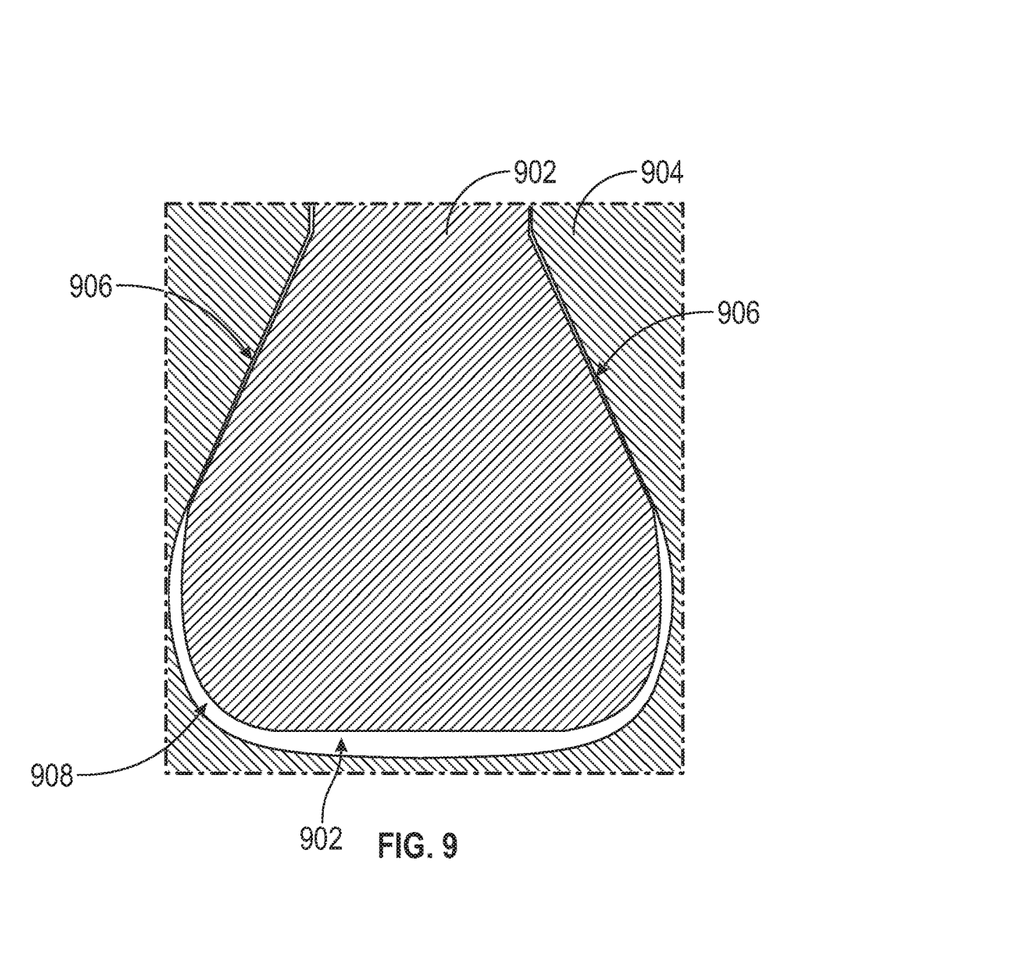
FIG. 9 is a schematic illustration of a rotor slot insert installed within a rotor slot of an integrally bladed rotor in accordance with an embodiment of the present disclosure.

Turning to FIG. 9, a schematic illustration of a rotor slot insert 900 installed within a rotor slot 902 of an integrally bladed rotor 904 in accordance with an embodiment of the present disclosure is shown. In this illustrative configuration both the rotor slot 902 and the rotor slot insert 900 have a dovetail geometry configuration. As shown, when installed, the rotor slot insert 900 has an interference engagement 906 along surfaces thereof to enable radial retention of the rotor slot insert 900 in the rotor slot 902. However, a gap 908 may exist at other areas of the rotor slot insert 900 relative to the material of the integrally bladed rotor 904. The gap 908 may be provided to enable thermal expansion of the rotor slot insert 900 during operation to provide sealing and prevent leakage recirculation airflow, as described above.

Figure 10A:
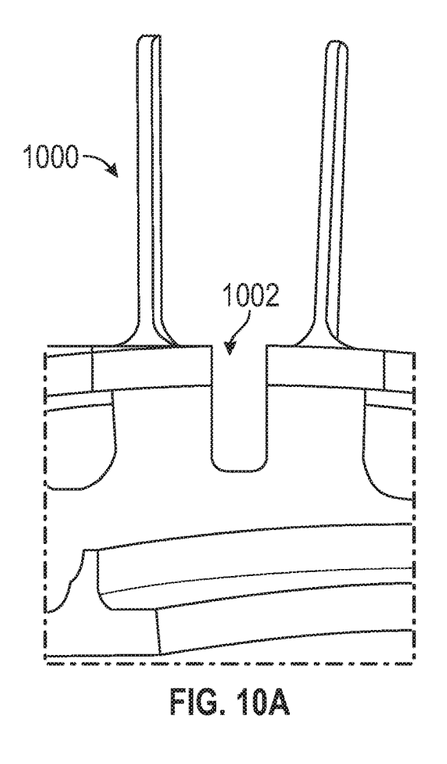
FIG. 10A is a schematic illustration of an integrally bladed rotor that may incorporate embodiments of the present disclosure.
Figure 10B:
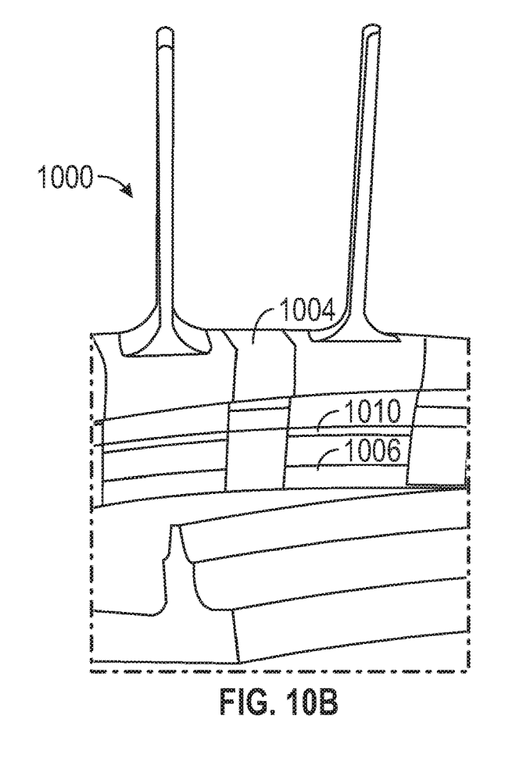
FIG. 10B is a schematic illustration of the integrally bladed rotor of FIG. 10A with rotor slot inserts and retaining elements installed thereto.
Figure 10C:
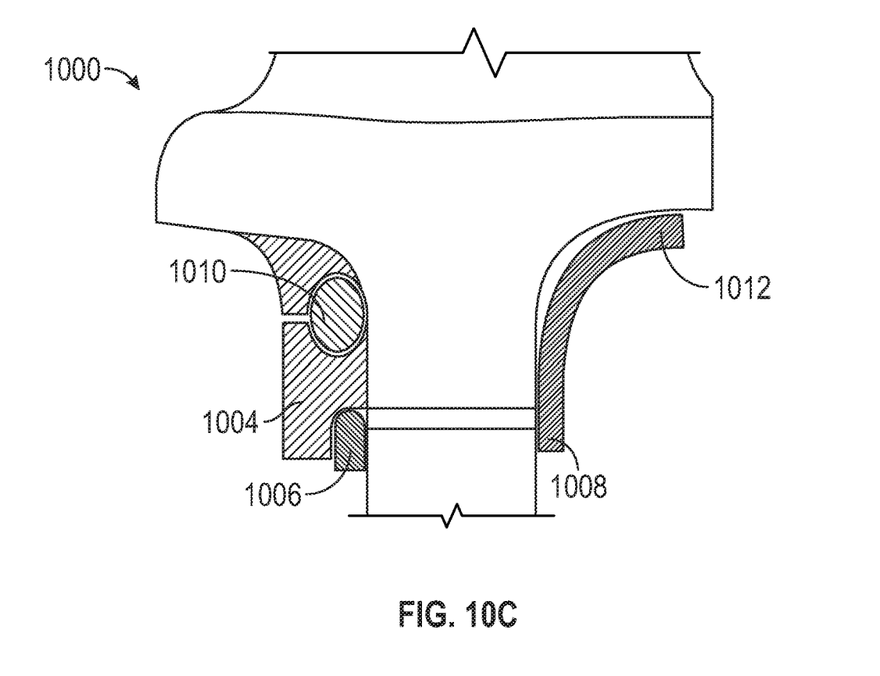
FIG. 10C is a side schematic illustration of the assembled integrally bladed rotor of FIG. 10B.

Turning now to FIGS. 10A-10C, schematic illustrations of an integrally bladed rotor 1000 in accordance with an embodiment of the present disclosure is shown. The integrally bladed rotor 1000 includes straight-sided rotor slots 1002 and respective straight-sided rotor slot inserts 1004. Because the straight-sided rotor slot inserts 1004 do not include specific radial retention (other than potential interference engagement with the straight-sided rotor slots 1002), in this embodiment additional retaining elements may be provided. For example, as shown, an axial retaining element 1006 may be configured to provide axial retention of the rotor slot insert 1004 to the integrally bladed rotor 1000 in operation with an integral axial stop 1008 of the rotor slot insert 1004. Further, a radial retaining element 1010 may be configured to provide radial retention of the rotor slot insert 1004 to the integrally bladed rotor 1000 in operation with an integral radial stop 1012 of the rotor slot insert 1004. In some embodiments, radial and/or axial retaining elements (separate from the rotor slot insert) may be employed on both sides of the integrally bladed rotor.

The rotor slot inserts of the present disclosure can include a retaining element or system such as a retainer ring hook for snap retainer ring assemblies. The rotor slot inserts may be solid or may be hollow, but otherwise arranged to fill a rotor slot and prevent air leakage from one side of an integrally bladed rotor to the other side of the integrally bladed rotor (i.e., prevent recirculation 412 shown in FIG. 4). In some embodiments, as shown above, the rotor slot insert can include an integral stop. In some embodiments, in addition to providing retention, the integral stop may be sized and shaped to provide additional coverage of the rotor slot and prevent leakage if a fluid-tight engagement is not achieved or possible between the rotor slot insert and the rotor slot. In embodiments that include a retaining element (e.g., as shown in FIGS. 5A-5B, in addition to the rotor slot insert include a locking slot, the integrally bladed rotor may also include a similar locking slot to provide secure engagement of the retaining element to secure and retain the rotor slot inserts into the rotor slots.

In some embodiments, the rotor slot inserts having an integral stop on one side thereon, the orientation of the integral slot may be specific based on application. For example, if the integral stop is configured to provide additional leakage prevention, the integral stop may be arranged on a high pressure side (e.g., downstream in FIG. 4). Due to this positioning, any pressure differential that may exist through the rotor slot will cause the integral stop to sealingly engage with a surface of the central hub of the integrally bladed rotor, and thus provide additional sealing and leakage prevention.

The rotor slot inserts of the present disclosure can be made of any desirable material, which may be selected based on operational parameters. Without limitation, materials that may be employed for the rotor slot inserts can include nickel-base alloys, titanium-base alloys, cobalt-base alloys, iron-base alloys, steel alloys, aluminum-base alloys, magnesium-base alloys, columbium-base alloys, nickel-copper alloys, copper alloys, ceramics, and composite materials. Further, as noted above, in some embodiments, the rotor slot inserts may be hollow. As such, the external shape and geometry of the rotor slot inserts may be as described above, but material may be omitted from the internal structure thereof. Such hollow rotor slot inserts may enable a reduction in weight, which in turn can reduce pull and stress of the rotor slot inserts during operation. Moreover, in some embodiments, the rotor slot inserts can include a fill in an interior of the structure of the rotor slot inserts.

Figure 11:
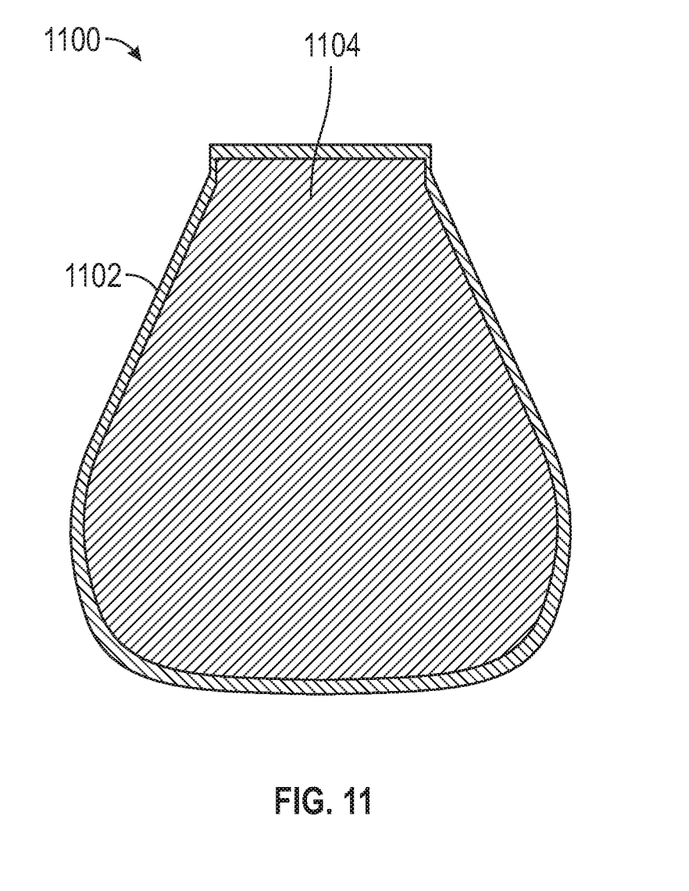
FIG. 11 is a schematic illustration of a rotor slot insert in accordance with an embodiment of the present disclosure.

For example, turning to FIG. 11, a schematic illustration of a rotor slot insert 1100 in accordance with an embodiment of the present disclosure is shown. The rotor slot insert 1100 may be similar to that shown and described above. In this embodiment, the rotor slot insert 1100 include a first material 1102 defining an exterior shell or shape for engagement within a rotor slot of an integrally bladed rotor. The rotor slot insert 1100 further includes a second material 1104 arranged within the shell defined by the first material 1102. The second material 1104 may be a fill material to enable strength and support for the first material, but also provide a weight reduction of the rotor slot insert 1100 as compared to a rotor slot insert formed from only or entirely from the first material. In some embodiments, the second material may be air, a gas, or a vacuum which may be selected to provide maximum weight reduction. Further, in some embodiments, the second material may be a foam or porous material. Still further, in some embodiments, the second material may be a solid material having a composition different from the first material.

As noted above, the rotor slot inserts may be configured to have an interference or press-fit engagement within a respective rotor slot of an integrally bladed rotor. The interference fit may be present during installation, or the interference fit may be formed during operation of the integrally bladed rotor within a gas turbine engine. That is, the operational temperatures may cause the material of the integrally bladed rotor and/or the rotor slot insert to thermally expand and thus form (or increase) an interference fit/engagement between the rotor slot insert and the rotor slot of the integrally bladed rotor. In some such embodiments, for example, the material selection for the rotor slot insert may be selected to have a high coefficient of thermal expansion to close gaps during operational temperatures. Furthermore, in some embodiments, the material may be selected to have a lower coefficient of thermal expansion to ensure that gaps are formed, if such configuration is desirable.

As such, the rotor slot inserts can be made of any desired material, which may be selected to achieve a desired property or characteristic. For example, one desirable characteristics may be to have the rotor slot inserts to have higher coefficient of thermal expansion than the material of the integrally bladed rotor to create a tight seal during operation. Further, the rotor slot inserts can be manufactured by any method, as will be appreciated by those of skill in the art. For example, additive manufacturing may be employed due to low stress in the rotor slot inserts and enable the potential to make hollow rotor slot inserts to reduce weight. Moreover, as discussed above, the rotor slot inserts can be press fit into the rotor slots to create a tight seal. In some embodiments, the material of the rotor slot inserts may be selected to be a material that is "softer" than the material of the integrally bladed rotor so that wear is on a relatively cheaper and replaceable rotor slot insert as compared to wear and replacement of the integrally bladed rotor.

Advantageously, embodiments provided herein can enable improved efficiency for turbine of gas turbine engines. For example, rotor slot inserts as described herein can provide for a slotted integrally bladed rotor, which has increased life due to inclusion of the slots, but prevents recirculation of gaspath air which can reduce efficiencies. The rotor slot inserts are configured to break the hoop stress at the airfoil fillet and move the limiting hoop stress radially inward to a more manageable location on the integrally bladed rotor. When a rotor slot is added, the limiting hoop location is located at the bottom of the rotor slot where different profiles (ellipses for example) can be incorporated to greatly reduce the stress magnitude. Furthermore, the bottom of the rotor slot can be inspected with a smaller flaw size detection capability than the airfoil fillet. The combination of reduction in hoop stress and decrease flaw size detection may enable an increase in the fracture life of the integrally bladed rotor as a whole. Rotor slot inserts of the present disclosure can be used to minimize air leakage caused by the inclusion of the rotor slots on an integrally bladed rotor. The slotted integrally bladed rotor is similar to an axial bladed insert, but without the blade attached to the insert. The slotted integrally bladed rotor may be lighter in weight and has the potential of less air leakage than an axial bladed design if slots are not incorporated between every airfoil of the integrally bladed rotor. The slotted integrally bladed rotor has the advantage of reduced hoop stress over a conventional integrally bladed rotor, but at the cost of increased air leakage, which is prevented by the rotor slot inserts of the present disclosure.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An integrally bladed rotor comprising:
   a central hub;
   an outer rim defining an outer circumference of the central hub, the outer rim defining a plurality of platforms;
   a plurality of circumferentially distributed blades, wherein a blade extends from each of the plurality of platforms;
   a rotor slot arranged between two adjacent blades, wherein the rotor slot is defined by a cut within the outer rim; and
   a rotor slot insert installed within the rotor slot, the rotor slot insert sized and shaped to fit within the rotor slot and prevent air leakage from a first side of the central hub to a second side of the central hub through the rotor slot during operation of the integrally bladed rotor,
   wherein the rotor slot insert comprises an integral stop configured to engage with the first side of the central hub.

2. The integrally bladed rotor of claim 1, wherein each of the rotor slot and the rotor slot insert have a dovetail geometry.

3. The integrally bladed rotor of claim 1, wherein the rotor slot insert comprises a locking slot, the integrally bladed rotor further comprising a retaining element configured to engage with the locking slot, wherein the retaining element secures the rotor slot insert to the integrally bladed rotor on the second side of the central hub.

4. The integrally bladed rotor of claim 3, wherein the retaining element is a retainer ring.

5. The integrally bladed rotor of claim 1, wherein each of the rotor slot and the rotor slot insert has straight sidewalls, wherein the integrally bladed rotor further comprises an axial retaining element configured to secure the rotor slot insert to the integrally bladed rotor in an axial direction and a radially retaining element configured to secure the rotor slot insert to the integrally bladed rotor in a radial direction.

6. The integrally bladed rotor of claim 1, wherein the rotor slot insert is hollow.

7. The integrally bladed rotor of claim 1, wherein the rotor slot insert comprises a first material defining an exterior shell.

8. The integrally bladed rotor of claim 7, further comprising a second material within the exterior shell, wherein the second material is different from the first material.

9. The integrally bladed rotor of claim 7, wherein the exterior shell is filled with a gas or contains a vacuum.

10. The integrally bladed rotor of claim 1, wherein the rotor slot insert is formed of a material that is different than a material of the integrally bladed rotor.

11. The integrally bladed rotor of claim 10, wherein the material of the rotor slot insert is a softer material than the material of the integrally bladed rotor.

12. The integrally bladed rotor of claim 1, wherein the rotor slot insert is formed from a material selected from a nickel-base alloy, a titanium-base alloy, a cobalt-base alloy, an iron-base alloy, a steel alloy, an aluminum-base alloy, a magnesium-base alloy, a columbium-base alloy, a nickel-copper alloy, a copper alloy, a ceramic material, and a composite material.

13. The integrally bladed rotor of claim 1, wherein the rotor slot insert forms an interference fit with the integrally bladed rotor within the rotor slot.

14. The integrally bladed rotor of claim 1, wherein the rotor slot insert comprises a material having a higher coefficient of thermal expansion than a material of the integrally bladed rotor to create an interference fit therebetween during operation of the integrally bladed rotor due to thermal expansion of the rotor slot insert.

15. The integrally bladed rotor of claim 1, further comprising:
a plurality of additional rotor slots such that one rotor slot is arranged between each pair of blades of the integrally bladed rotor; and
a plurality of additional rotor slot inserts arranged such that each rotor slot includes a rotor slot insert installed therein.

16. A gas turbine engine comprising:
an integrally bladed rotor having a central hub, an outer rim defining an outer circumference of the central hub, the outer rim defining a plurality of platforms, a plurality of circumferentially distributed blades, wherein a blade extends from each of the plurality of platforms, a rotor slot arranged between two adjacent blades, wherein the rotor slot is defined by a cut within the outer rim, and a rotor slot insert installed within the rotor slot, the rotor slot insert sized and shaped to fit within the rotor slot and prevent air leakage from a first side of the central hub to a second side of the central hub through the rotor slot during operation of the integrally bladed rotor,
wherein each of the rotor slot and the rotor slot insert has straight sidewalls, wherein the integrally bladed rotor further comprises an axial retaining element configured to secure the rotor slot insert to the integrally bladed rotor in an axial direction and a radially retaining element configured to secure the rotor slot insert to the integrally bladed rotor in a radial direction.

17. The gas turbine engine of claim 16, further comprising:
a plurality of additional rotor slots such that one rotor slot is arranged between each pair of blades of the integrally bladed rotor; and
a plurality of additional rotor slot inserts arranged such that each rotor slot includes a rotor slot insert installed therein.

18. The gas turbine engine of claim 16, further comprising a plurality of additional integrally bladed rotors.

19. The gas turbine engine of claim 16, the gas turbine engine comprising a high pressure compressor, wherein the integrally bladed rotor is a rotor of the high pressure compressor.

20. An integrally bladed rotor comprising:
a central hub;
an outer rim defining an outer circumference of the central hub, the outer rim defining a plurality of platforms;
a plurality of circumferentially distributed blades, wherein a blade extends from each of the plurality of platforms;
a rotor slot arranged between two adjacent blades, wherein the rotor slot is defined by a cut within the outer rim; and
a rotor slot insert installed within the rotor slot, the rotor slot insert sized and shaped to fit within the rotor slot and prevent air leakage from a first side of the central hub to a second side of the central hub through the rotor slot during operation of the integrally bladed rotor,
wherein the rotor slot insert comprises a first material defining an exterior shell and the exterior shell is filled with a gas or contains a vacuum.

* * * * *